(12) United States Patent
Brown et al.

(10) Patent No.: US 8,936,726 B2
(45) Date of Patent: Jan. 20, 2015

(54) TREATMENT OF CONTAMINATED LIQUIDS

(75) Inventors: Nigel Willis Brown, Stoke-on-Trent (GB); Edward P. L. Roberts, Chester (GB)

(73) Assignee: Arvia Technology Limited, Liverpool, Merseyside (GB)

( * ) Notice: Subject to any disclaimer, the term of this patent is extended or adjusted under 35 U.S.C. 154(b) by 131 days.

(21) Appl. No.: 13/318,979

(22) PCT Filed: May 6, 2010

(86) PCT No.: PCT/GB2010/000908
§ 371 (c)(1),
(2), (4) Date: Jan. 30, 2012

(87) PCT Pub. No.: WO2010/128298
PCT Pub. Date: Nov. 11, 2010

(65) Prior Publication Data
US 2012/0118829 A1     May 17, 2012

(30) Foreign Application Priority Data
May 6, 2009 (GB) .................................... 0907813

(51) Int. Cl.
*B01D 15/02* (2006.01)
*C02F 1/28* (2006.01)
(Continued)

(52) U.S. Cl.
CPC ............... *C02F 1/283* (2013.01); *B01D 53/08* (2013.01); *B01J 20/20* (2013.01); *B01J 20/3416* (2013.01);
(Continued)

(58) Field of Classification Search
USPC ................. 210/661, 670, 671, 690, 691, 694, 210/748.1, 748.01; 205/768, 753–755, 766; 423/448, 461
See application file for complete search history.

(56) References Cited

U.S. PATENT DOCUMENTS 4,013,554 A * 3/1977 Reis et al. ..................... 210/670
4,217,191 A * 8/1980 Doniat et al. ..................... 502/5
(Continued)

FOREIGN PATENT DOCUMENTS

EP 0915059 A1 5/1999
EP 0976447 A1 2/2000
(Continued)

OTHER PUBLICATIONS

Brown et al., "Atrazine removal using adsorption and electrochemical regeneration," Water Research, 39:3067-3074 (2004).
(Continued)

*Primary Examiner* — Matthew O Savage
(74) *Attorney, Agent, or Firm* — McAndrews, Held & Malloy Ltd.

(57) ABSTRACT

Contaminants are removed from a quantity of contaminated liquid in a treatment reservoir (2,28) containing a carbon based adsorbent material capable of electrochemical regeneration. The adsorbent material is in the form of a bed supported on a plate (6) at the base of the reservoir. The bed is agitated for a period to distribute the adsorbent material in the liquid and adsorb contaminant therefrom. At the end of the period the agitation ceases, and the bed of adsorbent material is allowed to settle. The adsorbent is then regenerated, during or after settlement, by passing an electric current through the bed to release from the adsorbent gaseous products derived from the contaminant, in bubbles rising through the decontaminated liquid in the reservoir. Various methods of regenerating the adsorbent material are disclosed, as are apparatus in which the method can be applied.

5 Claims, 3 Drawing Sheets

(51) Int. Cl.
  *B01D 53/08* (2006.01)
  *B01J 20/20* (2006.01)
  *B01J 20/34* (2006.01)
  *B01D 53/06* (2006.01)
  *C02F 1/34* (2006.01)
  *C02F 1/46* (2006.01)

(52) U.S. Cl.
  CPC ............ *B01J 20/3441* (2013.01); *B01D 53/06* (2013.01); *B01D 2253/102* (2013.01); *B01D 2257/70* (2013.01); *B01D 2259/40083* (2013.01); *C02F 1/34* (2013.01); *C02F 1/46* (2013.01); *C02F 2303/16* (2013.01)
  USPC ...... 210/661; 210/670; 210/748.01; 205/753; 205/755; 205/766

(56) References Cited

U.S. PATENT DOCUMENTS

| | | | |
|---|---|---|---|
| 4,239,607 | A | 12/1980 | Maget |
| 5,788,865 | A * | 8/1998 | Smirnov et al. ............... 210/690 |
| 2008/0245739 | A1 | 10/2008 | Honji |

FOREIGN PATENT DOCUMENTS

| | | |
|---|---|---|
| GB | 2470042 B | 10/2011 |
| JP | 58159888 | 9/1983 |
| JP | 5305281 A | 11/1993 |
| RU | 2009697 C1 | 3/1994 |
| RU | 2271247 C2 | 3/2006 |
| WO | 2007/125334 | 11/2007 |
| WO | 2007/125334 A1 | 11/2007 |
| WO | 2008/047132 | 4/2008 |
| WO | 2009/050485 | 4/2009 |
| WO | 2009/050485 A1 | 4/2009 |

OTHER PUBLICATIONS

Brown et al., "Electrochemical regeneration of a carbon-based adsorbent loaded with crystal violet dye," Electrochemica Acta, 49:3269-3281 (2004).
International Search Report in PCT/GB2010/000908, dated Aug. 27, 2009.
UKIPO Search Report in GB 0907813.0, dated Sep. 4, 2009.
Written Opinion in PCT/GB2010/000908, dated Aug. 27, 2009.
Great Britain Search Report under Section 17 dated Sep. 4, 2009, 1 pg.
Great Britain First Examination Report dated Mar. 8, 2011, 4 pgs.
Great Britain Second Examination Report dated Jul. 12, 2011, 2 pgs.
Office Action in RU2011149484, dated Feb. 21, 2014.

* cited by examiner

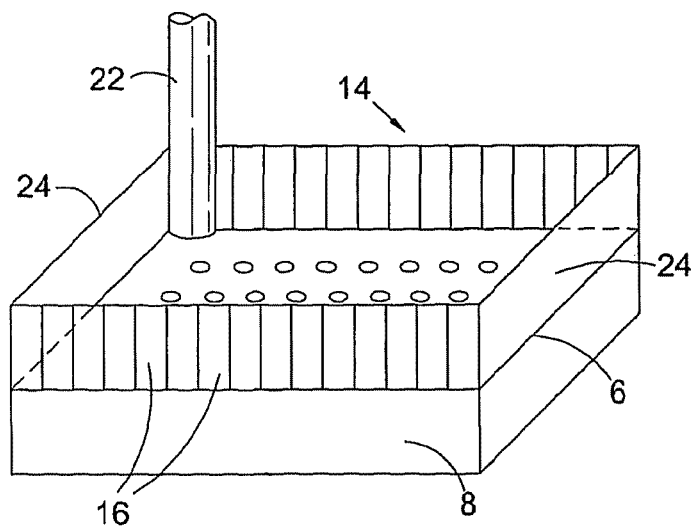
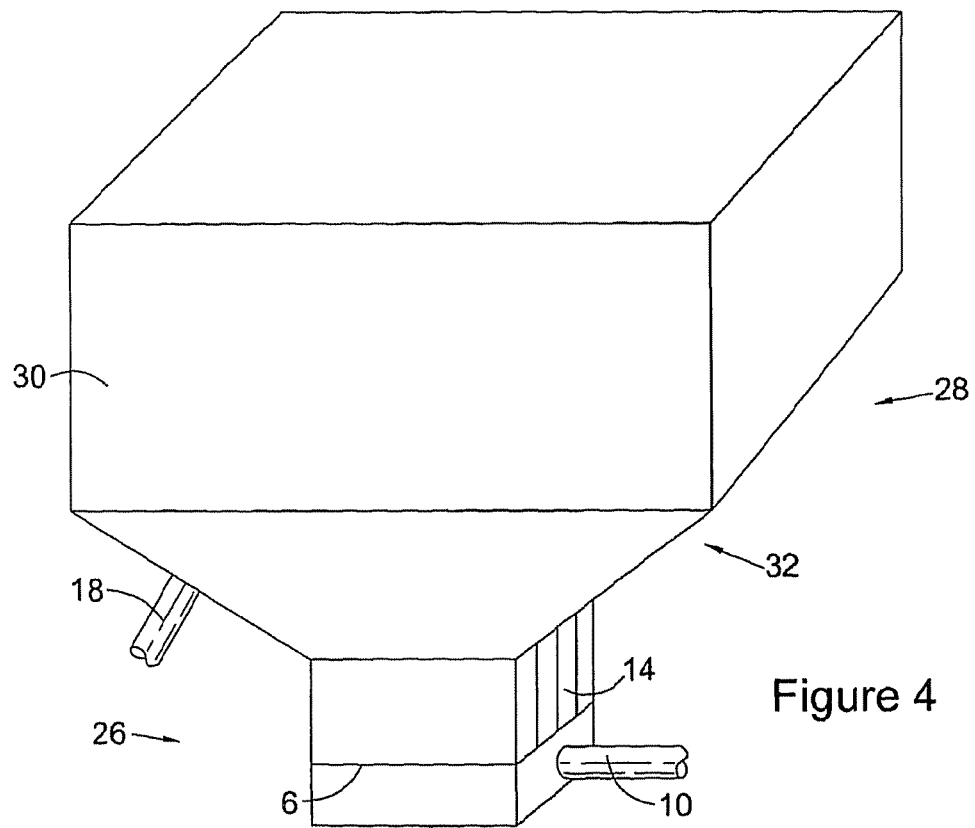

TREATMENT OF CONTAMINATED LIQUIDS

This application is a 371 National Phase filing of International Patent Application Serial No. PCT/GB2010/000908 filed May 6, 2010 which claims priority to Great Britain Patent Application No. 0907813.0 filed May 6, 2009. The above applications are incorporated herein by reference in their entirety.

This invention relates to products for the treatment of contaminated liquid by contact with an adsorbent material. It has particular, but not exclusive application in the treatment of liquids to remove organic pollutants. It uses technology disclosed in our International Patent Publication Nos.: WO 2007/125334 and WO 2008/047,132; unpublished International Patent Application No.: GB 07/20429.0; and unpublished British Patent Application No.: 0823165.6. The entire disclosure of these published and unpublished applications are incorporated herein by reference.

Adsorbent materials are commonly used in liquid treatment apparatus. Carbon-based such materials are particularly useful, and are capable of regeneration by the passage of an electric current therethrough. The use of carbon-based adsorbents in the treatment of contaminated water is described in the following papers published by The University of Manchester Institute of Science and Technology (now the University of Manchester) in 2004, incorporated herein by reference:

Electrochemical regeneration of a carbon-based adsorbent loaded with crystal violet dye by N W Brown, E P L Roberts, A A Garforth and R A W Dryfe
Electrachemica Acta 49 (2004) 3269-3281

Atrazine removal using adsorption and electrochemical regeneration by N W Brown, E P L Roberts, A Chasiotis, T Cherdron and N Sanghrajka Water Research 39 (2004) 3067-3074

The present invention is concerned particularly with the treatment of individual quantities of liquid in a batch rather than a continuous treatment process. According to the invention, in a method of removing contaminants from a quantity of contaminated liquid the liquid is delivered to a treatment reservoir containing a carbon based adsorbent material capable of electrochemical regeneration, in the form of a bed of material at the base of the reservoir. The bed is agitated for a period to distribute the adsorbent material in the liquid and adsorb contaminant therefrom, at the end of which period the agitation ceases, allowing the bed of material to settle. During this settlement period the adsorbent will separate from the liquid. The degree of separation depends upon the length of time allowed. It is possible to adjust the time scale according to the nature of the liquid being treated. The adsorbent is then regenerated, during or after settlement, by passing an electric current through the bed to release from the adsorbent gaseous products derived from the contaminant in bubbles rising through the decontaminated liquid in the reservoir, which is then removed. The liquid can of course be removed before the adsorbent is finally regenerated. At different stages of the regeneration period, the current can be adjusted. For example, at the beginning of the regeneration period, only a very thin layer of the adsorbent will have settled so a smaller current is required than later in the regeneration period when substantial settlement has occurred.

In the method of the invention adsorption occurs within the regeneration zone as well as the adsorption zone, facilitating a compact and potentially mobile apparatus. It also allows for a larger regeneration zone. An increase in the size of the electrodes would be beneficial for treatment liquid containing a high concentration of contaminant.

Particular advantages of the above method are that it allows a treatment cycle to be selected for the particular liquid to be treated. The method allows the steps of agitating the bed and allowing it to settle, and of regenerating the adsorbent, to be repeated to remove further contaminant from the liquid prior to its removal. Put another way, the degree of decontamination of the liquid can be monitored, and the method adapted accordingly. It will also be appreciated that the relative sizes of the regeneration and adsorption zones can be varied according to the treatment required. The quantity of adsorbent that is added to the tank can be adapted to type and load of contamination present in the liquid. The ability to modify the method, the quantity of adsorbent and the relative sizes of adsorption and regeneration zones gives a process with significant flexibility.

Preferred adsorbent materials for use in the method of the invention comprise unexpanded intercalated graphite, preferably in powder or flake form. The material may consist only of unexpanded intercalated graphite, or a mixture of such graphite with one or more other adsorbent materials, as described in our Application filed today entitled: "Adsorbents for Treating Contaminated Liquid". Individual particles of the adsorbent can themselves comprise a mixture of more than one adsorbent material.

In methods of the invention, the bed of adsorbent material is normally agitated by the delivery of fluid to the base of the bed. The fluid will normally be a gas, such as air, but in some circumstances a liquid can be used. The liquid may be neutral such as water, or may be the contaminated liquid itself as or as part of its delivery to the reservoir. In other words, the contaminated liquid can be delivered to the treatment reservoir as part of the agitating process, at least in an initial decontamination stage. If a subsequent decontamination stage is required, a different agitator fluid, such as air, can be used. The agitating fluid can itself include a treatment component or a component to be treated if required.

Apparatus for carrying out the method of the invention can be simply designed to enable the method steps to be carried out. The apparatus comprises a reservoir for the liquid having an upper and a lower section. The reservoir will contain a particulate adsorbent material, preferably of the kind referred to above, capable of electrochemical regeneration, and in the form of a bed supported in the lower section at the base of the reservoir. An agitator is installed for agitating the bed to distribute the particles in liquid contained in the reservoir including the upper section, and electrodes are disposed from opposite sides of the lower section for delivery of an electric current to pass through the bed of particles. The agitator will normally comprise a chamber under the bed with discharge orifices directed upwardly therefrom into the bed, and means will be provided for delivering fluid under pressure through the orifices into the bed to distribute the bed particles. Typically, the agitator will comprise a plurality of nozzles, for example in the form of a manifold, for directing fluid under pressure upwards into the bed of particles. It could be in the form of a chamber with a porous plate above. The agitator can be provided with means for connecting it to an external source of pressurised fluid, but could be quite independent with a source of pressurised fluid being installed in the agitator itself. This provides for the possibility of the agitator being installed in an existing reservoir to treat contaminated liquid on site. Provided the agitator dimensions are compatible with those of the reservoir, the agitator can be installed and the bed of particles formed thereover, prior to delivery of the contaminated liquid, from above or below the bed of particles.

An additional means for agitation of the content of the reservoir can be included in the form of a mechanical mixer with the extra function of preventing coagulation of the adsorbent material and treatment liquid. Coagulation can prove a problem as it entraps the agitation bubbles, reducing the density of the adsorbent material and therefore causing it to float. This reduces the efficiency of adsorption and can cause incomplete separation. This can be a problem associated with the presence of, for example, a surfactant or oil in the liquid to be treated. In a preferred embodiment of the experiment, the mixer is positioned within an upper section of the reservoir and attached to a lid or cover if used, but it could be incorporated anywhere in the adsorption section of the chamber. A mechanical mixer can also be used to fluidise the bed as an alternative to the use of pressurised fluid. This could be necessary when the contaminated liquid is of a nature that should not be exposed to bubbles; for example, foaming agents or highly volatile agents.

Generally, the reservoir in apparatus of the invention will have a substantially uniform horizontal cross-section, with the bed of adsorbent particles extending across the entirety of that cross-section. However, the cross-sections of the upper and lower reservoir sections do not have to be the same, and particularly for relatively small quantities of contaminated liquid, the bed of adsorbent material can be defined in a lower section of smaller cross-section than the upper section, and into which the adsorbent material flows as it settles. In this embodiment, the reservoir can then take the form of a hopper with an intermediate section between the upper and lower sections around which the reservoir wall or walls converge towards the lower section in which the adsorbent bed is formed.

The reservoir may be closed by a lid or cover (not shown), to increase the pressure under which the agitation process is performed, increasing the efficiency of adsorption. In order to maintain the desired pressure within the reaction chamber one or more valves will be needed to provide controlled release of the gases generated or used in the process.

In the practice of the method of the invention, when the agitated adsorbent bed material has been allowed to settle, it is regenerated by passing an electric current through the bed. This current is created by the application of a voltage between electrodes on opposite sides of the bed. Normally, the cross-section of the bed or lower section of the reservoir will be square or rectangular, with the electrodes disposed on opposite sides of the lower section. A plurality of electrodes can be disposed along each of these sides. For example, in a reservoir having a uniform rectangular cross-section of 200×100 cm, 30 electrodes might be disposed along each of the longer opposite sides. Multiple electrodes can be installed horizontally to allow different currents to be applied at different heights in the bed during regeneration.

The invention may also be adapted to remove contaminants from contaminated gas. In this variant the method comprises delivering a liquid to a treatment reservoir containing a carbon-based adsorbent material capable of electrochemical regeneration in the form of a bed of particles at the base of the reservoir; and delivering the contaminated gas to the bed of adsorbent material to agitate the bed and distribute the adsorbent material in the liquid and adsorb contaminant from the contaminated gas. The decontaminated gas is released through the liquid. The agitation is then stopped, and the bed of material allowed to settle; and the adsorbent regenerated by passing an electric current through the bed to release from the adsorbent gaseous products derived from the contaminant in bubbles rising through the liquid in the reservoir. The respective gases can be collected separately or discharged as appropriate. It will be appreciated that essentially the same apparatus can be used as is described above.

The invention will now be described by way of example and with reference to the accompanying schematic drawings wherein:

FIG. 3 is a perspective view of a device for supporting a fluidized bed in apparatus according to the invention;

FIG. 4 is a perspective view of an alternative form of apparatus according to the invention;

Figure 1:
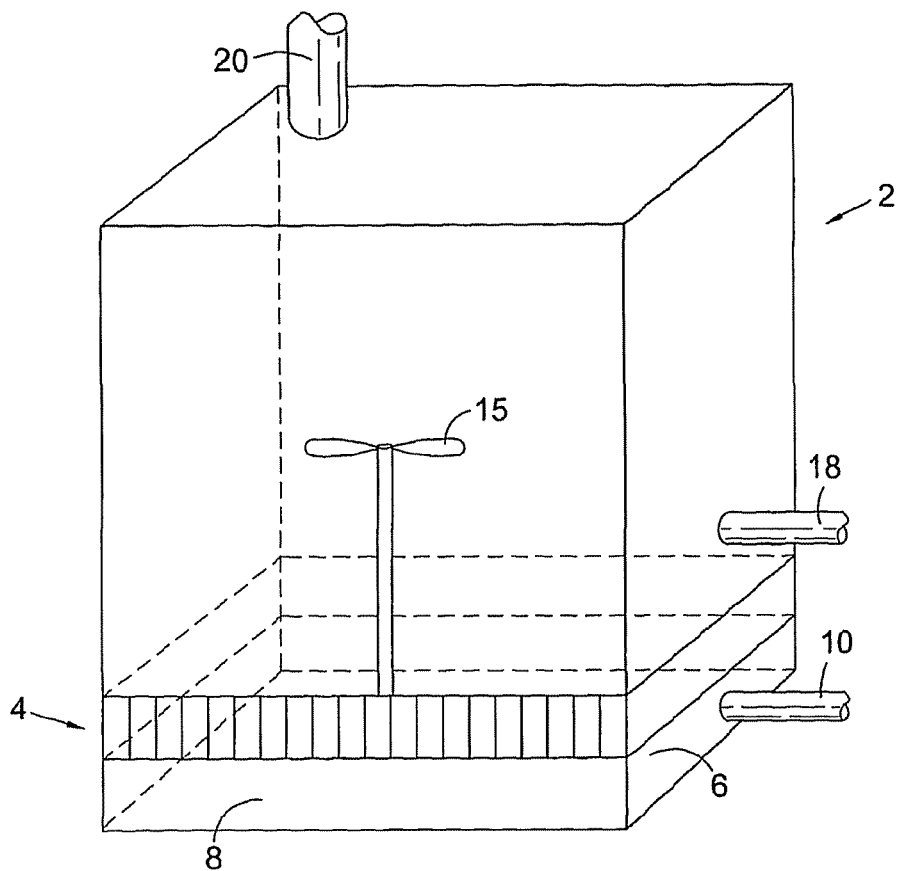
FIG. 1 is a perspective view of apparatus according to one embodiment of the invention.

FIG. 1 illustrates a simple tank 2 of rectangular horizontal cross-section. In the lower section 4 of the tank a bed of particulate adsorbent material is supported on a plate 6. Beneath the plate 6 is a chamber 8 for receiving a fluidising medium, such as air, from inlet pipe 10.

Figure 2:
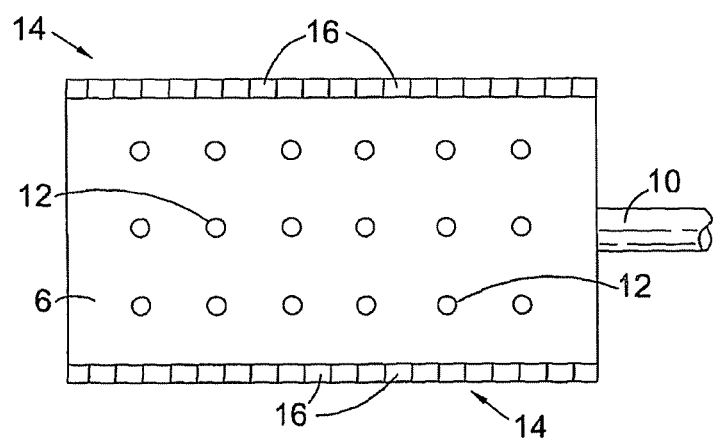
FIG. 2 is a top plan view of the base of the reservoir in FIG. 1, upon which a bed of adsorbent is supported.

FIG. 2 is a horizontal cross-sectional view of the lower section 4 of the tank 2, specifically showing the plate 6 and the inlet pipe 10. FIG. 2 also shows the openings 12 in the plate for the passage of fluidising medium from the chamber 8 below. On the opposite longer sides of the plate 6, and extending upwardly therefrom, are two banks 14 of electrodes 16. The bed of adsorbent material is supported on the plate 6 within the walls of the container 2, between the banks 14 of electrodes 16.

The adsorbent material used in the practice of the present invention is carbon based, and provided in particulate form that can be readily fluidised within a body of liquid. Preferred adsorbents are those disclosed in the Patent Publications and Applications referred to above. In use of the apparatus of FIGS. 1 and 2, contaminated liquid is delivered to the tank 2 which is normally open at the top. The adsorbent material is then fluidised by delivery of a suitable medium through input 10 to distribute the adsorbent material within the body of contaminated liquid then contained in the tank. The adsorbent takes contaminants from the liquid which attach to the surfaces of the adsorbent particles. After a predetermined period of time, the flow of fluidizing medium is stopped with the consequence that the adsorbent material settles on the plate 6 between the banks 14 of electrodes 16. At this point the decontaminated liquid can be removed through discharge 18 but its removal may be deferred. Its degree of decontamination can be measured, and if this is now acceptable then it may be removed. If further decontamination is required, it is retained in the tank 2.

If required, additional agitation of the liquid in the upper section of the tank 2 can be provided by a mechanical mixer indicated at 15. This can be a simple paddle, which will normally be sufficient if it is to function in conjunction with the fluidising medium delivered through the plate 6. If it is to be the only agitating mechanism, then it can be installed within or under the bed to urge the adsorbent material into the upper section, but it can be installed in the upper section itself. Particularly if disposed at the surface of liquid of the reservoir it can be used to coagulated particles.

Whether or not the decontaminated liquid has been removed, the adsorbent material in the bed supported on the plate 6 can now be regenerated. This is accomplished by passing an electric current through the material of the bed between the electrodes 16. This releases the adsorbed contaminants in the form of carbonaceous gases and water. The gases are released either through the open top of the tank 2, or if the top is closed, through a separate exhaust duct 20, possibly for subsequent treatment. If the decontaminated liquid remains in the tank, the released gases merely bubble through it. Contaminated liquid retained in the tank after regeneration of the adsorbent material can of course now be further decontaminated by re-fluidization of the bed to distribute the particulate adsorbent once more within the liquid. This sequence can be repeated, with the degree of decontamination of the liquid being monitored after each treatment.

In the apparatus of FIG. 1 the bed of adsorbent material; the means for fluidizing the bed to distribute the material within liquid in the tank; and the electrodes for regenerating the adsorbent after a decontamination treatment, are all integrated in the tank construction. However, it will be appreciated then, that the tank is a mobile decontamination unit that can be moved between sites where one or more batches of liquid must be contaminated, but where a permanent installation is not required. If a suitable tank is already on site, then it is the decontamination system; the bed of adsorbent and fluidizing mechanism that can be delivered separately. Such a system is illustrated in FIG. 3 which, as can be seen, includes the same elements as are present in the lower section of the tank 2 in FIG. 1, with the exception of the input 10 for the fluidizing medium. This is replaced by a pipe 22, which can extend through the top of an on-site container for connection to a source of fluidizing medium. In use, the system shown in FIG. 3 will be installed in the lower section of a tank, with suitable seals between the end boundaries 24 and the electrode banks 14 with the walls of the container, and the adsorbent material then delivered to rest on the plate 6 between the electrode banks 14. Contaminated liquid is then delivered to the tank and the treatment followed, as described above. When the treatment is complete, the respective tank can be drained and the system removed together with or separate from the adsorbent material on the plate 6.

FIG. 4 shows an alternative apparatus according to the invention which is suitable for smaller quantities of contaminated liquid; for example, for experimental use. The elements of the apparatus are essentially similar to those of the apparatus of FIGS. 1 and 2, but the cross-section of the lower section 26 of the tank 28 is smaller than that of the upper section 30. In the treatment process, the adsorbent material on the plate 6 is fluidized in the same way by delivery of a simple medium through input 10, and when delivery of the fluidizing medium is halted, the adsorbent material is directed back into the lower section 26 by the converging container walls 32. Additional mixing may be required within the expanded upper zone if it is significantly larger than the lower section and this can be provided by additional agitators.

Figure 5:
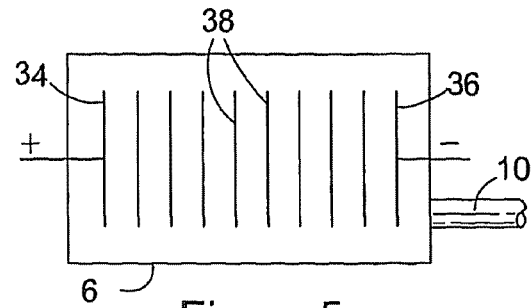
FIG. 5 is a top plan view of an alternative base of the reservoir of FIG. 1, below the level of the distribution plate, and showing an alternative arrangement of regeneration electrodes.

FIG. 5 illustrates another embodiment of the invention in which a multiplicity of electrodes can be closely aligned in a cell in a parallel arrangement. Application of a voltage across the outer electrodes 34 and 36 polarises the intermediate electrodes 38, so effectively a series of alternate cathodes and anodes are present between the outermost cathode 34 and anode 36. The use of bipolar electrodes in this way facilitates one current to be generated a number of times with a proportional increase in voltage. This has the advantage of increasing the voltage to obtain a larger current in the adsorbent material in sections of the bed between the electrodes than would be achieved by the simple application of a larger voltage across the bed as a whole. The distance between the electrodes can be up to about 25 mm; this is sufficient to allow cell voltage to be kept at an acceptable level, without creating blockages of the adsorbent material, and to allow the released contaminants to escape in the form of bubbles.

In the regeneration zone of apparatus of the invention the cathode will normally be housed in a separate compartment defined by a porous membrane or filter cloth to protect it from direct contact with the adsorbent material. A porous membrane enables a catholyte to be pumped through the compartment, serving both to provide a means for controlling the pH level and as a coolant for removing heat from the regeneration zone.

Figure 6:
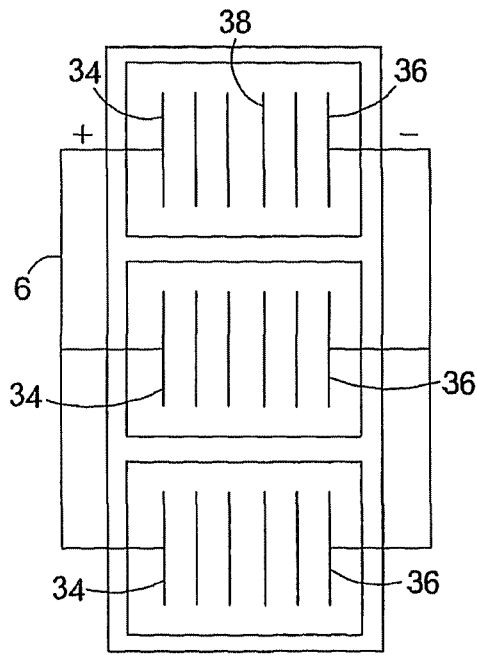
FIGS. 6 and 7 illustrate the use of multiple cells in the base of apparatus according to the invention.
Figure 7:
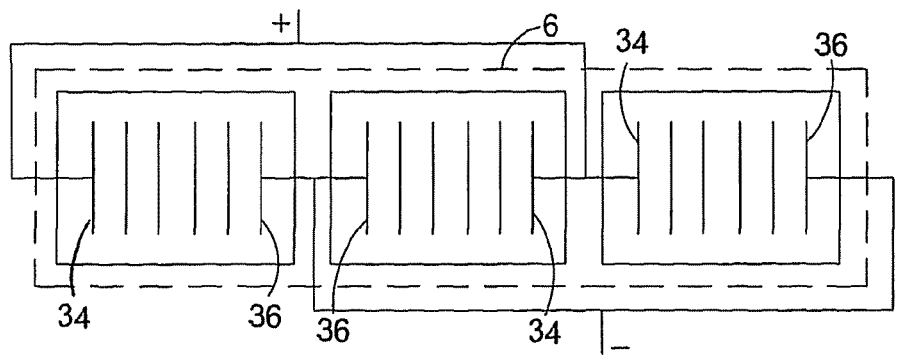

Apparatus of the invention may contain a single cell, or a plurality of cells. FIG. 6 illustrates an arrangement of cells in an adjacent arrangement to one another with equal polarity. FIG. 7 shows cells arranged in a continuous line, with opposite polarities in order to prevent unnecessary consumption of current. In each of the arrangements shown in FIGS. 6 and 7, the respective outermost electrodes must be connected in parallel.

The invention claimed is:

1. A method of removing contaminants from a quantity of contaminated liquid, comprising:
   a) delivering the liquid into a treatment reservoir containing a quantity of carbon-based adsorbent material capable of electrochemical regeneration in the form of a settled bed of particles at a base of the reservoir;
   b) agitating the settled bed to distribute the entire quantity of adsorbent material throughout the entire quantity of contaminated liquid in the treatment reservoir to adsorb contaminant therefrom;
   c) ceasing the agitation after said agitating of the bed in step b) to allow the bed of material to settle in the treatment reservoir thereby forming a settled bed of particles at the base of the reservoir;
   d) regenerating the adsorbent by passing an electric current through the settled bed in the treatment reservoir formed in step c) to release from the adsorbent gaseous products derived from the contaminant in bubbles rising through the liquid in the reservoir; and
   e) removing the decontaminated liquid from the tank after step d).

2. A method according to claim 1 wherein the steps of agitating the settled bed and allowing it to settle, and of regenerating the adsorbent, are repeated to remove further contaminant from the liquid prior to its removal.

3. A method according to claim 1 wherein the settled bed of adsorbent material is agitated by the delivery of a fluid to the base of the bed of adsorbent.

4. A method according to claim 3 wherein the fluid is the contaminated liquid, or is a gas, such as air.

5. A method according to claim 1 wherein the reservoir comprises an upper section for receiving liquid to be treated and a lower section for housing the settled bed of adsorbent, the cross-section of the lower section being less than that of the upper section, and wherein the settled bed of adsorbent material re-forms in the lower section to be regenerated.

* * * * *